Nov. 11, 1924.  
W. C. PROTZ  
TINSEL ORNAMENT  
Filed April 11, 1924  
1,514,788

Inventor  
William C. Protz  
By William A. Strauch  
Attorney

Patented Nov. 11, 1924.

1,514,788

UNITED STATES PATENT OFFICE.

WILLIAM C. PROTZ, OF MANITOWOC, WISCONSIN.

TINSEL ORNAMENT.

Application filed April 11, 1924. Serial No. 705,943.

*To all whom it may concern:*

Be it known that I, WILLIAM C. PROTZ, a citizen of the United States, residing at Manitowoc, in the county of Manitowoc and State of Wisconsin, have invented certain new and useful Improvements in Tinsel Ornaments, of which the following is a specification.

The present invention relates to tinsel ornaments.

More particularly the invention relates to ornamental tree or miniature Christmas tree favors. In the production of ornaments of this character, it is essential that an article attractive in appearance which may be readily and cheaply manufactured in quantities be provided in order that commercial success may be attained.

An object of the invention is to provide a novel and attractive miniature tree structure that may be readily and cheaply manufactured.

Another object of the invention is to provide a miniature tree which may be used as a favor and which will have the appearance of being decorated with silvery or other colored reflecting tinsel, or with a mixture of various colored tinsels.

A further object of the invention is to provide a miniature tree structure having a bright mottled scintillating appearance in light, and which when subjected to gentle breezes will sway and quiver in substantially natural manner of a tree in the wind.

Other objects of the invention are such as will appear in the following detailed description of the preferred embodiments of the invention of which—

Figure 5:
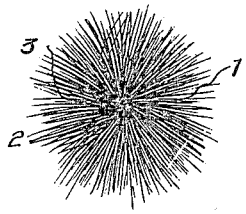
Fig. 5 is a sectional view taken along line AA of Fig. 1.
Figure 4:
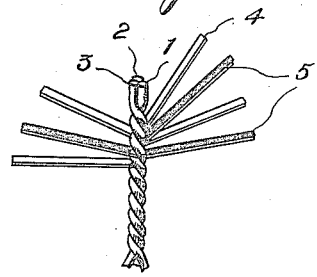
Fig. 4 is a fragmental perspective view showing the construction of the tree body.
Figure 3:
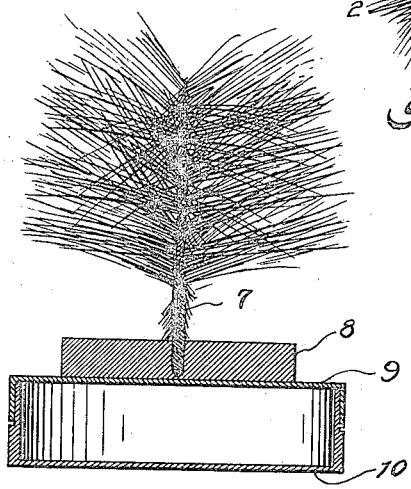
Fig. 3 is a sectional view showing the preferred base construction.

Each tree comprises a central core or trunk member consisting of wires 1, 2 and 3 with projecting strips of tinsel 4 and 5 twisted between the wires in a manner to form a bushy tree shaped body of tinsel 6. The strips of tinsel 4 and 5 are secured between the twisted wires in a manner to extend outwardly in substantially all directions from the central wire core in the manner of branches, and in such manner as to give a uniform bushy appearance. The cross sections of the tree perpendicular to the wire center have a substantially circular appearance as shown in Fig. 5.

The strips 4 of tinsel preferably have bright silvery reflecting surfaces and are intermingled and distributed uniformly with colored strips of tinsel 5. In the preferred form strips 5 comprise reflecting tinsel with the reflecting surfaces colored or dyed to a suitable green and the silvery or bright reflecting tinsel 4 is preferably alternated and interspersed in substantially uniform manner between the colored tinsel strips 5. It will however be understood that the relative proportions of colored tinsel and silvery tinsel strips and the distribution thereof may be varied within wide limits depending upon the desired appearance. In practice equal proportions of silvery and green tinsel strips distributed in substantially alternating and uniform manner give a very attractive appearance. The tinsel is bound in at different reflecting angles and the silvery reflecting surfaces catch and reflect the colored appearance of the green or other colored strips, presenting a mottled scintillating appearance which in the light gives the appearance of a tree decorated with silvery and colored tinsel. It will be understood that other colors may be intermingled with the green and silvered tinseled in desired proportions.

The tree bodies 6 are formed in the machine to form tinsel streamers as disclosed in copending application, Serial Number 705,942, filed April 11, 1924, the wires 1, 2 and 3 being used to make up the central core in place of the cords and wire used in the streamers, and the knives being given the proper travel to produce the desired tree shapes. The various colored tinsels are bound in between the twisted wires by winding the proper relative number of different colored strands on the spools which are placed on the rotating machine head, as disclosed for the manufacture of the mixed color streamer in the copending case. In the preferred form the size of wires 1, 2 and 3 is chosen so that when twisted into the body of the tree, they are sufficiently stiff to form a straight trunk for the tree, and will still be flexible enough to permit the trees to sway in a gentle breeze. The tinsel forming the branches will be of usual light and thin quality so that they will quiver in a breeze.

The bodies 6, as formed are in long sections. These sections are then taken from the machine and cut to form the individual bodies. Tinsel strips extending from the lower part of the body are preferably twisted around the wire base portion of the tree to cover the wire core and form a shaggy decorated base or stem portion 7, covered with intermingled colored and silvery tinsel. The completed tree portion is then preferably inserted in a block 8 of wood or any other suitable material. Block 8 may be secured to a support which is preferably a box-like structure comprised of a cover member 9 and a base member 10 made of any suitable material, as for example cardboard, paste-board, wood and the like.

Figure 1:
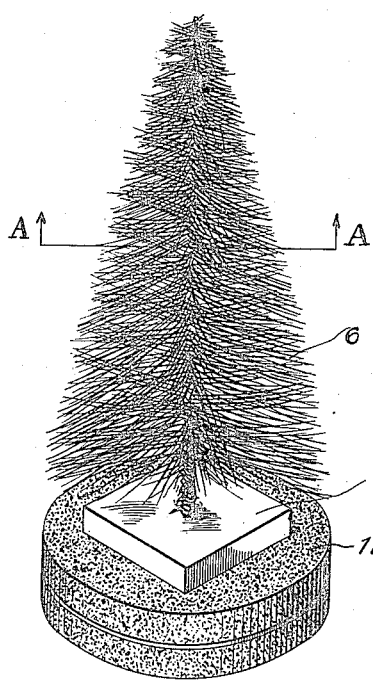
Figs. 1 and 2 are perspective views showing preferred forms of the invention.
Figure 2:
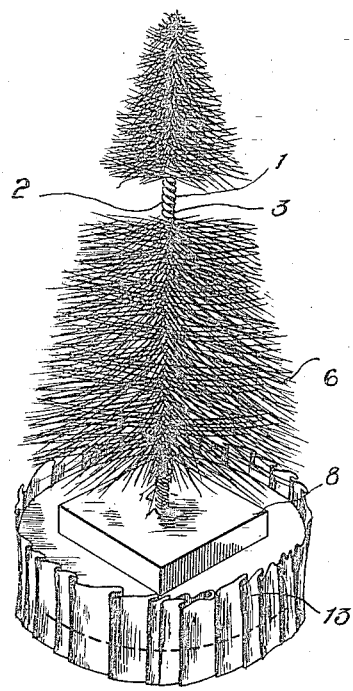

Block 8 is preferably colored to contrast with the tree body, a red color of suitable shade forming an excellent combination. If it is desired to use the support as a container for articles, the top and sides may be suitably decorated for example by securing thereto particles of reflecting or colored material 12 as indicated in Fig. 1. An attractive arrangement is made by covering the top of 9 with a crêpe paper or other material contrasting in color with block 8, and surrounding the base with a contrasting colored ruffle 13 of crêpe or other suitable material, as shown in Fig. 2. Effective combinations are made comprising a tree body of green and silvery tinsel, a block 8 of red, a green covering for member 9, and a red or a green crêpe paper ruffle 13.

It will be understood that the shapes of the base blocks and supports may be varied widely, and that such changes are contemplated and within the scope of the present invention which is limited only by the terms of the appended claims.

Having described preferred embodiments of the invention what is desired to be secured by Letters Patent and claimed as new is:

1. A miniature tree comprising a central core of twisted wire strands, and a plurality of strips of tinsel secured between the twisted wire in a manner to extend laterally from said central core to form the branches of said tree.

2. The combination as set forth in claim 1 in which said central core of twisted wire is flexible to permit swaying of the tree in a gentle breeze.

3. A miniature tree comprising a central core, and a plurality of short strips of various colored reflecting tinsel projecting from said central core to form the branches for said tree, said colored strips being intermingled in a manner to give the tree a decorated appearance.

In testimony whereof I affix my signature.

WILLIAM C. PROTZ.